(12) United States Patent
Good et al.

(10) Patent No.: US 11,428,896 B2
(45) Date of Patent: Aug. 30, 2022

(54) HOUSING OF AN IMAGE CAPTURING DEVICE

(71) Applicant: Hand Held Products, Inc., Fort Mill, SC (US)

(72) Inventors: Timothy Good, Indian Land, SC (US); Gregory Rueblinger, Stratford, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 447 days.

(21) Appl. No.: 16/594,831

(22) Filed: Oct. 7, 2019

(65) Prior Publication Data

US 2021/0103121 A1    Apr. 8, 2021

(51) Int. Cl.
G02B 7/02       (2021.01)
H04N 5/225      (2006.01)
G06K 7/10       (2006.01)
G02B 7/09       (2021.01)
G06K 7/14       (2006.01)

(52) U.S. Cl.
CPC ............... *G02B 7/09* (2013.01); *G02B 7/025* (2013.01); *G06K 7/10722* (2013.01); *G06K 7/10881* (2013.01); *G06K 7/1413* (2013.01); *G06K 2007/10524* (2013.01)

(58) Field of Classification Search
CPC . G02B 7/02; G02B 7/025; G02B 7/09; G06K 7/10881; H04N 5/2254
USPC .......................................................... 359/823
See application file for complete search history.

(56) References Cited

U.S. PATENT DOCUMENTS

| | | |
|---|---|---|
| 2003/0019934 A1* | 1/2003 | Hunter ............... G06K 7/10732 235/462.2 |
| 2007/0058964 A1 | 3/2007 | Shangguan et al. |
| 2009/0103193 A1 | 4/2009 | Berube |
| 2011/0013295 A1 | 1/2011 | Chou |
| 2011/0075278 A1 | 3/2011 | Nagaoka et al. |
| 2019/0208094 A1 | 7/2019 | Nakamura et al. |

OTHER PUBLICATIONS

Extended European Search Report issued in European Application No. 20200648.2 dated Feb. 19, 2021.

* cited by examiner

*Primary Examiner* — Toan C Ly
(74) *Attorney, Agent, or Firm* — Alston & Bird LLP (57) ABSTRACT

A housing of an imaging unit is disclosed. The housing comprises an outer surface and an inner surface, wherein the inner surface of the housing defines a lens channel sized to receive a lens barrel. Further, the inner surface of the housing defines a helical step in the lens channel, wherein the helical step protrudes outwardly into the lens channel, and wherein the helical step is angled at a first predetermined pitch. Further, the inner surface of the lens channel defines a glue pocket, in the lens channel, which extends from the inner surface of the housing to the outer surface of the housing such that a first edge surface, defining a portion of a periphery of the glue pocket, is coplanar with the helical step.

19 Claims, 7 Drawing Sheets

HOUSING OF AN IMAGE CAPTURING DEVICE

TECHNOLOGICAL FIELD

Exemplary embodiments of the present disclosure relate generally to an image capturing device and, more particularly, to a housing of an imaging unit in the image capturing device.

BACKGROUND

Typically, image capturing devices, such as but not limited to, cameras, barcode scanners, and imagers, include an imaging unit that is configured to capture images of an object. The imaging unit further includes a housing, an image sensor and a lens barrel. The housing may be configured to receive the image sensor and the lens barrel in such a manner that ambient light passes through the lens barrel and is focused on the image sensor. In order to ensure that the light from the lens barrel focuses on the image sensor, the lens barrel and the image sensor need to be aligned with each other.

In some examples, the housing may include features such as flanges and protrusions that are used to define a position, where the lens barrel and the image sensor are to be positioned or installed. Accordingly, the features in the housing facilitate alignment between the lens barrel and the image sensor. Further, to reinforce the alignment between the lens barrel and the image sensor, adhesive may be used to fixedly attach the lens barrel and the image sensor to the housing. However, in some examples, post application of the adhesive, the adhesive may shrink (for example by −0.015 mm). Such property of the adhesive may cause the lens barrel to move, within the housing, leading to a misalignment between the image sensor and the lens barrel.

Applicant has identified a number of deficiencies and problems associated with conventional housing of the image capturing device. Through applied effort, ingenuity, and innovation, many of these identified problems have been solved by developing solutions that are included in embodiments of the present disclosure, many examples of which are described in detail herein.

BRIEF SUMMARY

According to the embodiments disclosed herein, an image capturing device is disclosed. The image capturing device comprises an imaging unit that further comprises a housing. The housing has an inner surface. The inner surface of the housing defines a lens channel. Further, the inner surface of the housing defines a helical step that protrudes outwardly from the inner surface into the lens channel. The helical step is angled at a first predetermined pitch. The inner surface of the lens channel further defines a glue pocket, in the lens channel, which extends from the inner surface of the housing to an outer surface of the housing such that a first edge surface, defining a portion of a periphery of the glue pocket, is parallel with a portion of the helical step. Further, the imaging unit comprises a lens barrel received in the lens channel. The lens barrel comprising an outer surface that defines a cam such that the cam protrudes out from the outer surface of the lens barrel. The outer surface of the lens barrel further defines a helical rib that protrudes out from the outer surface of the lens barrel, wherein the helical rib having a second predetermined pitch, wherein the first predetermined pitch is the same as the second predetermined pitch. The portion of the helical rib extends out from the first edge surface, defining the portion of the periphery of the glue pocket.

According to the embodiments disclosed herein, a housing of an imaging unit is disclosed. The housing comprises an outer surface and an inner surface. The inner surface of the housing defines a lens channel sized to receive a lens barrel. Further, the inner surface of the housing defines a helical step in the lens channel, wherein the helical step protrudes outwardly into the lens channel, and wherein the helical step is angled at a first predetermined pitch. Further, the inner surface of the lens channel defines a glue pocket, in the lens channel, which extends from the inner surface of the housing to the outer surface of the housing such that a first edge surface, defining a portion of a periphery of the glue pocket, is parallel with a portion of the helical step.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image sensor" is referred to as a solid state device that is capable of generating electrical signals corresponding to the light signals that impinges on the image sensor. Some examples of the image sensor may include a color or monochrome 1D or 2D CCD, CMOS, NMOS, PMOS, CID CMD solid state image sensor or any other device, that may be capable to generating electrical signal based on the received light signals.

It is commonly understood that image capturing devices such as indicia readers or barcode scanners have an imaging unit that is capable of capturing and processing images. In some examples, the imaging unit may include a housing for one or more components such as one or more lenses (positioned in a lens barrel), an image sensor and a controller. In an example embodiment, the one or more components may operate in conjunction, to facilitate the image capturing device to capture and process an image of the object. For instance, the one or more lenses in the lens barrel may focus the light obtained from the object on the image sensor that, accordingly, generates electrical signals. The controller may, thereafter, process the electrical signals to render the captured image.

In some examples, an alignment between the lens barrel and the image sensor may govern the quality of the captured image. Misalignment between the lens barrel and the image sensor may lead to capturing of an out of focus image, which may be undesirable. In order to keep the lens barrel aligned with the image sensor, the housing of the imaging unit may define features such as grooves or flanges that may ensure that the lens barrel and the image sensor are aligned with each other. To this end, adhesive may be applied between the lens barrel and the housing to keep the lens barrel fixed at a position within the housing, thereby aligning the lens barrel with the image sensor. In some examples, curing of the adhesive causes the adhesive to shrink by few millimeters or micrometers. Such phenomena may modify the position of the lens barrel within the imaging unit, which may further lead to misalignment between the image sensor and the lens barrel.

The apparatuses described herein disclose an image capturing device that includes an imaging unit. The imaging unit further includes a cuboidal shaped housing (hereinafter referred to as housing) having a sensor end portion and a scan window end portion. Further, the housing has an outer surface and an inner surface. The inner surface of the housing defines at least one lens channel. In some examples, the at least one lens channel has a cylindrical shape and extends from the sensor end portion to the scan window end portion. Further, in some examples, the at least one lens channel may be sized to receive a lens barrel. For example, the at least one lens channel may be sized larger than lens barrel such that the lens barrel is seamlessly received in the at least one lens channel.

Further, the inner surface of the housing defines a helical ramp within the at least one lens channel such that the helical ramp may protrude out from the inner surface of the housing and may circumferentially rotate about a first longitudinal axis of the at least one lens channel at a first predetermined pitch with respect to a first lateral axis of the housing. In an example embodiment, the first predetermined pitch of the helical ramp may correspond to an angle between the helical ramp and the first lateral axis.

In an example embodiment, the helical rib may have a first edge and a second edge. The first edge of the helical ramp face towards the scan window end portion of the housing while a second edge that face towards the sensor end portion of the housing. In an example embodiment, a distance between the first edge of the helical ramp and the second edge of the helical ramp along the first central longitudinal axis of the at least one lens channel corresponds to a first width of the helical ramp. In some examples, the helical ramp may have a constant first width, as the helical ramp rotates about the first central longitudinal axis of the at least one lens channel. In some examples, the helical ramp may have a first end and a second end. The first end of the helical ramp and the second end of the helical ramp correspond to circumferential extremities of the helical ramp. Further, because of the first predetermined pitch of the helical ramp, the first end of the helical ramp is positioned proximal to the scan window end portion of the housing while the second end of the helical ramp is positioned proximal to the sensor end portion of the housing. In an instance in which the helical ramp is defined to rotate by at least 360 degrees about the first central longitudinal axis of the at least one lens channel, the first end of the helical ramp may be positioned adjacent to the second end of the helical ramp along the first central longitudinal axis of the at least one lens channel. Accordingly, the first end and the second end, in conjunction, define a blocking section. The purpose of the blocking section is further described below.

In alternative embodiment, the helical ramp may extend from the first edge of the helical ramp to the sensor end portion of the housing. In such an embodiment, the helical ramp may not have the second edge and the first edge of the helical ramp may define a first step, as viewed from the scan window end portion of the housing. Since helical ramp circumferentially rotates about the first longitudinal axis of the at least one lens channel at a first predetermined pitch, the first step also rotates about the first longitudinal axis of the at least one lens channel at the first predetermined pitch.

In some examples, the first step divides the at least one lens channel in a first portion and a second portion. The first portion of the at least one lens channel extends from the scan window end portion of the housing to the first step (defined by the helical ramp and the inner surface of the housing). The second portion of the at least one lens channel extends from the first step to the sensor end portion of the at least one lens channel. As the first step is defined by the helical ramp that protrudes out from the inner surface of the housing and the helical ramp extends from the first step to the sensor end portion of the housing, therefore, a diameter of the at least one lens channel in the first portion is greater than a diameter of the at least one lens channel in the second portion.

In some examples, the first step may have a first end and a second end. The first end of the first step and the second end of the first step corresponds to circumferential extremities of helical ramp. Further, because of the first predetermined pitch of the first step, the first end of the first step is positioned proximal to the scan window end portion of the housing while the second end of the first step is positioned proximal to the sensor end portion of the housing. In an instance in which the first step is defined to rotate by at least 360 degrees about the first central longitudinal axis of the at least one lens channel, the first end of the first step may be positioned adjacent to the second end of the first step along the first central longitudinal axis of the at least one lens channel. Accordingly, the first end and the second end of the first step define the blocking section.

Additionally, the inner surface of the housing defines at least one glue pocket within the at least one lens channel. The at least one glue pocket may extend from the inner surface of the housing to the outer surface of the housing. In some examples, the at least one glue pocket may correspond to a through hole that extends from the inner surface of the housing to the outer surface of the housing. It is commonly understood that when a through hole is defined in a housing, one or more edge surfaces, defining a periphery of the through hole, also get created. Accordingly, a periphery of the at least one glue pocket may be defined by the one or more edge surfaces that may extend from the outer surface of the housing to the inner surface of the housing. In some examples, the one or more edge surfaces may define a shape of the at least one glue pocket. In one example embodiment, the at least one glue pocket may have an arcuate shape such that a first edge surface of the one or more edge surfaces is parallel to a second edge surface of the one or more edge surfaces. Further a third edge surface and a fourth edge surface of the one or more edge surfaces may have a semi-circular profile. For example, the third edge surface and the fourth edge surface may be C-shaped profile. In an example embodiment, the inner surface of the housing may define the at least one glue pocket in such manner that the first edge surface (of the one or more edge surfaces defining the periphery of the at least one glue pocket) may be positioned proximal to the sensor end portion of the housing, while the second edge surface (of the one or more edge surfaces defining the periphery of the at least one glue pocket) may be positioned proximal to the scan window end portion of the housing. Further, in some examples, the first edge surface may be parallel with a portion of the first edge of the helical ramp defined in the at least one lens channel. More particularly, the first edge surface (proximal to the sensor end portion of the housing) is parallel with the portion of the first edge of the helical ramp positioned below the first edge portion along a vertical axis of the housing. To this end, a first plane passing through the first edge surface along the vertical axis of the housing may be parallel to the second plane passing through the portion of the first edge of the helical ramp along the vertical axis of the housing. Since the second edge surface is parallel to the first edge surface and the first edge surface is parallel to the portion of the first edge of the helical ramp therefore, the first edge surface, the second edge surface, and the portion of the first edge of the helical ramp are parallel with each other. In some examples, the scope of the disclosure is not limited to the first edge surface being parallel to the second edge surface. In an alternative embodiment, the first edge surface may be parallel to the portion of the first edge of the helical ramp, however, the first edge surface may not be parallel to the second edge surface.

In an example embodiment, the at least one glue pocket may be defined proximal to the scan window end portion of the housing such that the at least one glue pocket is defined between the scan end portion of the housing and the helical ramp. Further, the helical ramp is defined proximal to the sensor end portion such that the helical ramp is defined between the glue pocket and the sensor end portion of the housing.

In an example embodiment, the at least one lens channel is configured to receive the lens barrel from the scan window end portion. In an example embodiment, the lens barrel may correspond to lens housing for one or more lenses. As discussed, the one or more lenses may be configured to focus the light received from the object onto an image sensor positioned at the sensor end portion of the housing. In some examples, the lens barrel has a sensor end, a light receiving end, and an outer surface that extends between the sensor end of the lens barrel and the light receiving end of the lens barrel. The outer surface of the lens barrel defines at least one cam that protrudes out from the outer surface of the lens barrel and extends along a second longitudinal central axis of the lens barrel. In some examples, the at least one cam may have a first end, a second end, and a central portion. The first end of the at least one cam is configured to be proximal to the sensor end of the lens barrel, while the second end of the at least one cam is proximal to the light receiving end of the lens barrel. In some examples, the central portion of the at least one cam extends between the first end of the at least one cam and the second end of the at least one cam. In an example embodiment, the at least one cam may have a trapezoidal shape, an elliptical shape, a rectangular shape, and/or the like.

Additionally, the outer surface of the lens barrel defines a helical rib that protrudes out from the outer surface of the lens barrel. Further, the outer surface of the lens barrel defines the helical rib such that the helical rib circumferentially rotates about the second longitudinal central axis of the lens barrel. Furthermore, the outer surface defines the helical rib such that the helical rib is angled at a second predetermined pitch with respect to a second lateral axis of the lens barrel. In an example embodiment, the second predetermined pitch may correspond to an angle between the helical rib and the second lateral axis of the lens barrel. In some examples, the first predetermined pitch of the helical ramp is same as the second predetermined pitch of the helical rib. Since the outer surface of the lens barrel defines the cam along the second longitudinal central axis of the lens barrel and since the outer surface of the lens barrel defines the helical rib to rotate circumferentially around the longitudinal central axis of the lens barrel, in some examples, the helical rib may intersect the cam. For example, the helical rib may intersect the cam at the second end of the cam and at the central portion of the cam.

In an example embodiment, the helical rib may have a first edge and a second edge. The first edge of the helical rib faces toward the sensor end of the lens barrel, while the second edge of the helical rib faces toward the light receiving end of the lens barrel. Further, a second width of the helical rib may be defined as a distance between the first edge of the helical rib and the second edge of the helical rib, along the second central longitudinal axis of the lens barrel. In an example embodiment, the helical rib may have a constant second width, as the helical rib rotates about the second central longitudinal axis of the lens barrel. In alternate embodiment, the helical rib may not have a second edge. In such an embodiment, the helical rib may extend from the first edge of the helical rib to the light receiving end of the lens barrel. Further, in such embodiment, the first edge may correspond to a second step. In some examples, the second step of the helical rib divides the lens barrel into a first portion and a second portion. the first portion of the lens barrel extends from the light receiving end portion to the second step of the helical rib, while the second portion of the lens barrel extends from the second step of the helical rib to the sensor end of the lens barrel. Further, since the helical rib protrudes from the outer surface of the lens barrel and the helical rib extends between the second step of the helical rib and the light receiving end of the lens barrel, therefore, a diameter the first portion of the lens barrel is greater than a diameter of the second portion of the lens barrel. Furthermore, in such embodiment (where the helical rib extends between the light receiving end of the lens barrel and the first edge of the helical rib), the cam may not have the second end.

In an instance in which the lens barrel is received in the at least one lens channel, the first end of the cam abuts the first edge of the helical ramp defined on the inner surface of the at least one lens channel. In alternate embodiment, the first end of the cam abuts the first step defined by helical ramp and the inner surface of the housing. In some examples, the cam is slidable on the helical ramp, thereby, enabling adjustment of the position of the lens barrel in the at least one lens channel along the first central longitudinal axis of the at least one lens channel. For example, to adjust the position of the lens barrel in the at least one lens channel, the lens barrel may be rotated about the second central longitudinal axis of the lens barrel, while the cam on the lens barrel abuts the first edge of the helical ramp. Such rotation causes the cam to slide on the first edge of the helical ramp in the at least one lens channel. Since the first edge of the helical ramp has the first predetermined pitch with respect to the first lateral axis of the housing, sliding of the cam on the step changes the position of the lens barrel along the first central longitudinal axis of the at least one lens channel. In some examples, the position of the lens barrel in the at least one lens channel along the first central longitudinal axis of the at least one lens channel may be adjusted to modify a focal point of the one or more lenses in the lens barrel. The focal point of the lens barrel may be adjusted to ensure that the light received by the lens barrel gets focused on the image sensor (positioned at the sensor end portion of the housing).

In some examples, the rotation of the lens barrel within the at least one lens channel is restricted by the blocking section defined by the first end of the helical ramp and the second end of the helical ramp. For example, the lens barrel may be rotatable in a clockwise direction in the at least one lens channel until the cam on the lens barrel abuts the blocking section (defined by the first end of the helical ramp and the second end of the helical ramp). The blocking section thwarts further rotation of the lens barrel in the clockwise direction. In some examples, the lens barrel may be thereafter rotatable in the anti-clockwise direction.

In an example embodiment, additionally, when the lens barrel is received in the at least one lens channel and the first end of the at least one cam abuts the first edge of helical ramp, a portion of the helical rib (defined by the outer surface of the lens barrel) extends out from the second edge surface (proximal of the scan window end portion of the housing) of the one or more edge surfaces defining the periphery of the at least one glue pocket. Since the second predetermined pitch of the helical rib is same as the first predetermined pitch of the helical ramp (defined in the lens channel), a distance between the helical rib and the helical ramp remains constant, irrespective of the position of the lens barrel (along the first central longitudinal axis of the at least one lens channel) within the at least one lens channel. As discussed, the helical ramp and the first edge surface (proximal of the sensor end portion of the housing) of the one or more edge surfaces defining the periphery of the at least one glue pocket, are parallel. Accordingly, a distance between the first edge of the helical rib (facing towards the sensor end of the lens barrel) and the first edge surface (proximal of the scan window end portion of the housing) of the one or more edge surfaces defining the periphery of the glue pocket, also remains constant, irrespective of the position of the lens barrel in the at least one lens channel (along the first central longitudinal axis of the at least one lens channel).

Furthering the example embodiment, as the distance between the first edge of the helical rib (facing towards the sensor end of the lens barrel) and the first edge surface (proximal of the sensor end portion of the housing), of the one or more edge surfaces defining the periphery of the at least one glue pocket, remains constant, an amount of adhesive to be disposed between the first edge of the helical rib (facing towards the sensor end of the lens barrel) and the first edge surface (proximal of the sensor end portion of the housing), of the one or more edge surfaces defining the periphery of the at least one glue pocket, remains constant across various manufactured imaging unit. Therefore, manufacturing consistency is achieved across multiple imaging units. For example, variations due to curing of the glue (e.g., movement of the lens barrel within lens channel due to curing of the glue) remain consistent during manufacturing of various imaging units. Therefore, any anticipated change in the focal point of the lens barrel (due to glue curing) can be compensated prior to the glue curing consistently across various imaging unit. Additionally, the shrinkage of the adhesive pulls the helical rib on the lens barrel towards the helical ramp in the at least one lens channel, which causes tight abutting of the cam on the step created by the helical ramp.

Figure 1:
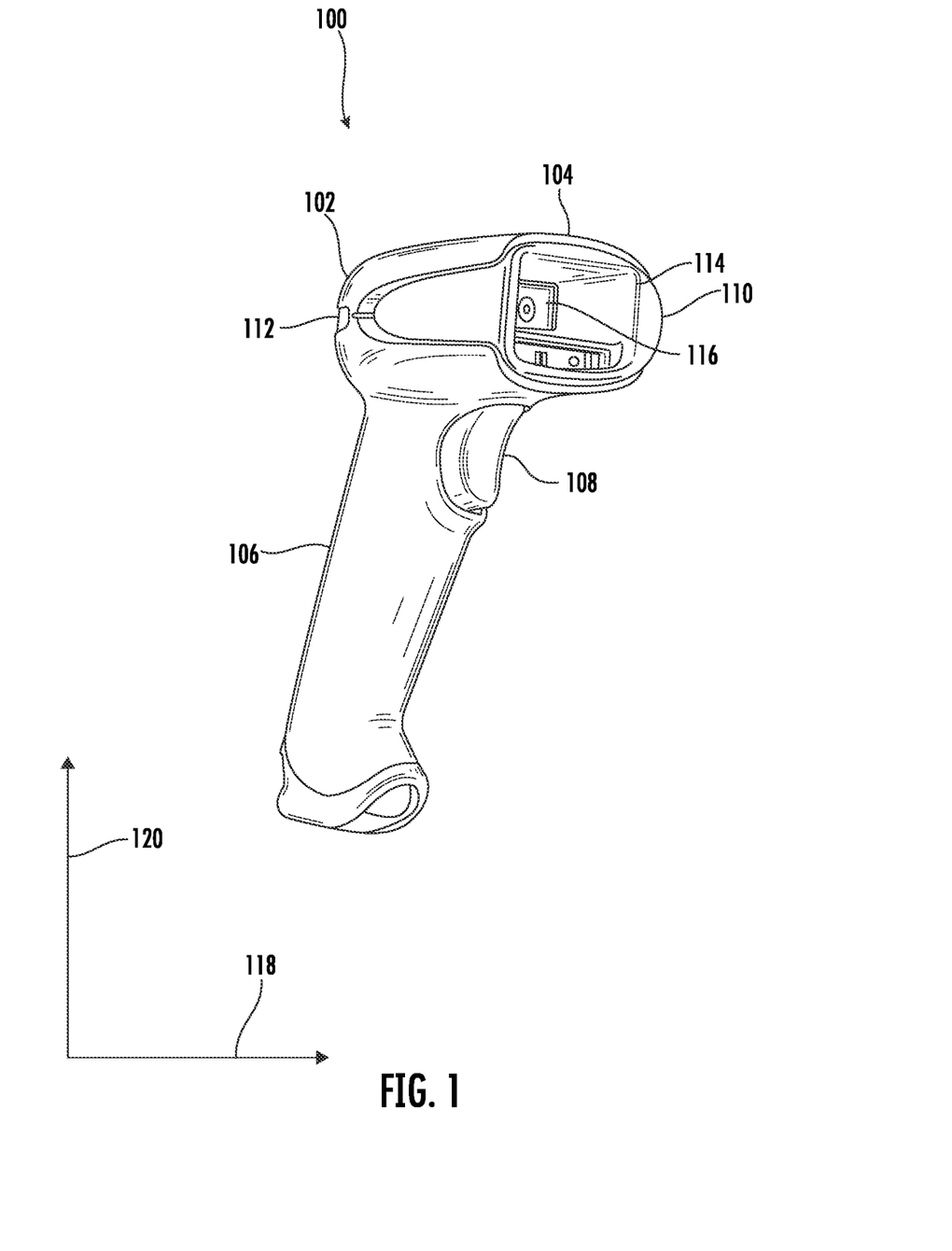
FIG. 1 illustrates a perspective view of an image capturing device, according to one or more embodiments described herein.

FIG. 1 illustrates a perspective view 100 of an image capturing device 102, according to one or more embodiments described herein. In an example embodiment, the image capturing device 102 may correspond to a barcode scanner that may be capable of scanning and reading machine readable codes such as a barcode, a QR code, 2D code, Datamatrix code, and/or the like. In some example, the image capturing device 102 may be further capable of reading and recognizing text from an image, without departing from the scope of the disclosure.

In an example embodiment, the image capturing device 102 may include a head portion 104, a handle portion 106, and a trigger button 108. In some examples, the head portion 104 may have an arcuate shape that has a scan window end 110 and a rear end 112. In an example embodiment, the scan window end 110 and the rear end 112 of the head portion 104 may be spaced apart from each other along a first lateral axis 118. In an example embodiment, the head portion 104 may define a scan window 114, at the scan window end 110 of the head portion 104. In an example embodiment, the scan window 114 may be configured to receive an imaging unit 116. In an example embodiment, the imaging unit 116 may include one or more components (e.g., processors, lenses, illumination devices, cameras, and/or the like) for performing scanning operations. The structure of the imaging unit 116 is further described in conjunction with FIGS. 2-7.

The handle portion 106 may extend out from the head portion 104 along a first longitudinal axis 120 of the image capturing device 102. In some examples, the trigger button 108 may be positioned on the handle portion 106. In some examples, the trigger button 108 may be positioned on the head portion 104, without departing from the scope of the disclosure.

By way of example, a user of the image capturing device 102 may point the image capturing device 102 in the direction of a target object such that the scan window end 110 is pointed towards the target object. The user may input a command (e.g., via the trigger button 108) and cause the imaging unit 116 to scan the target object. In some embodiments, the information gathered by the imaging unit 116 may be transmitted a host (not shown) over a communication network (not shown).

Figure 2:
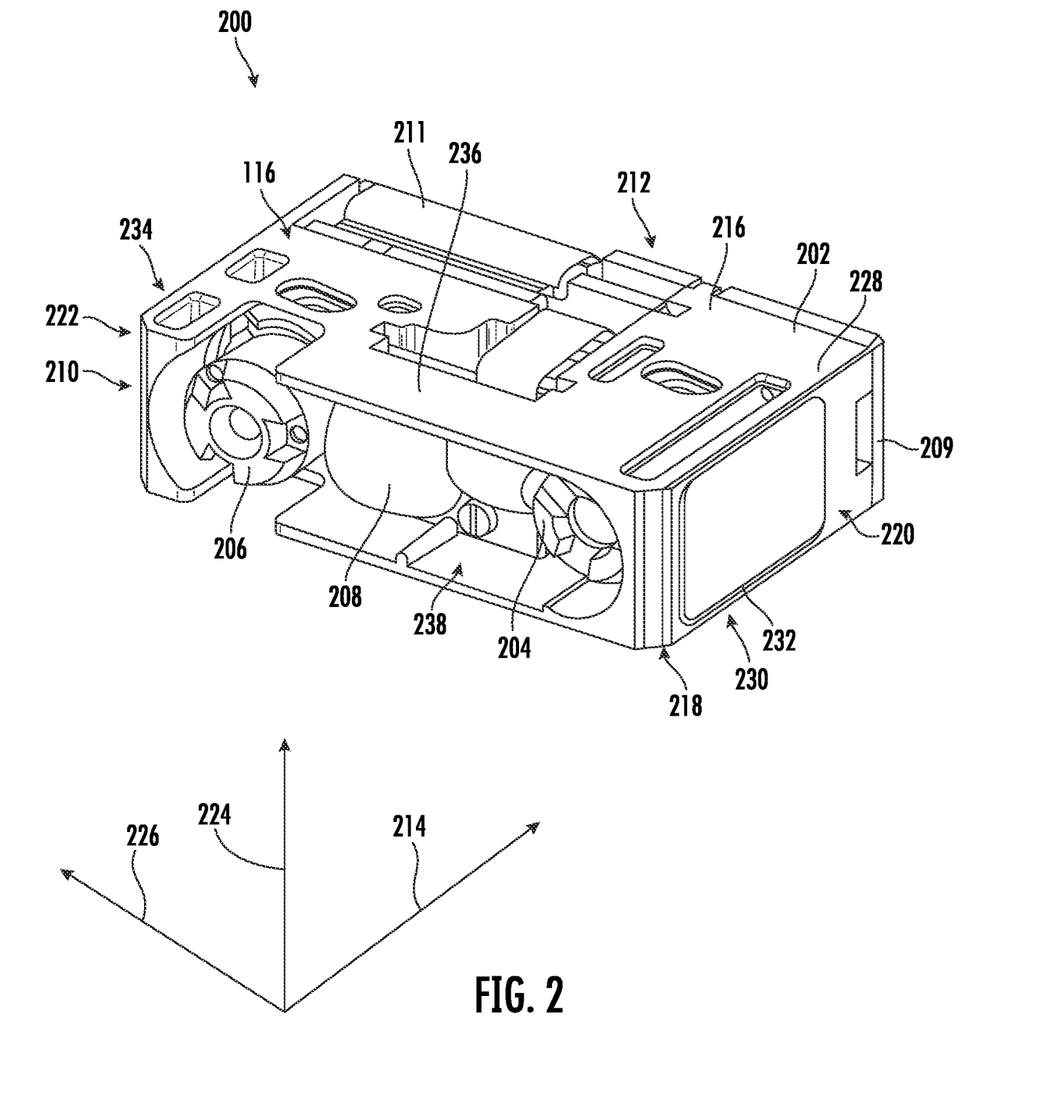
FIG. 2 illustrates a perspective view of an imaging unit, according to one or more embodiments described herein.
Figure 3:
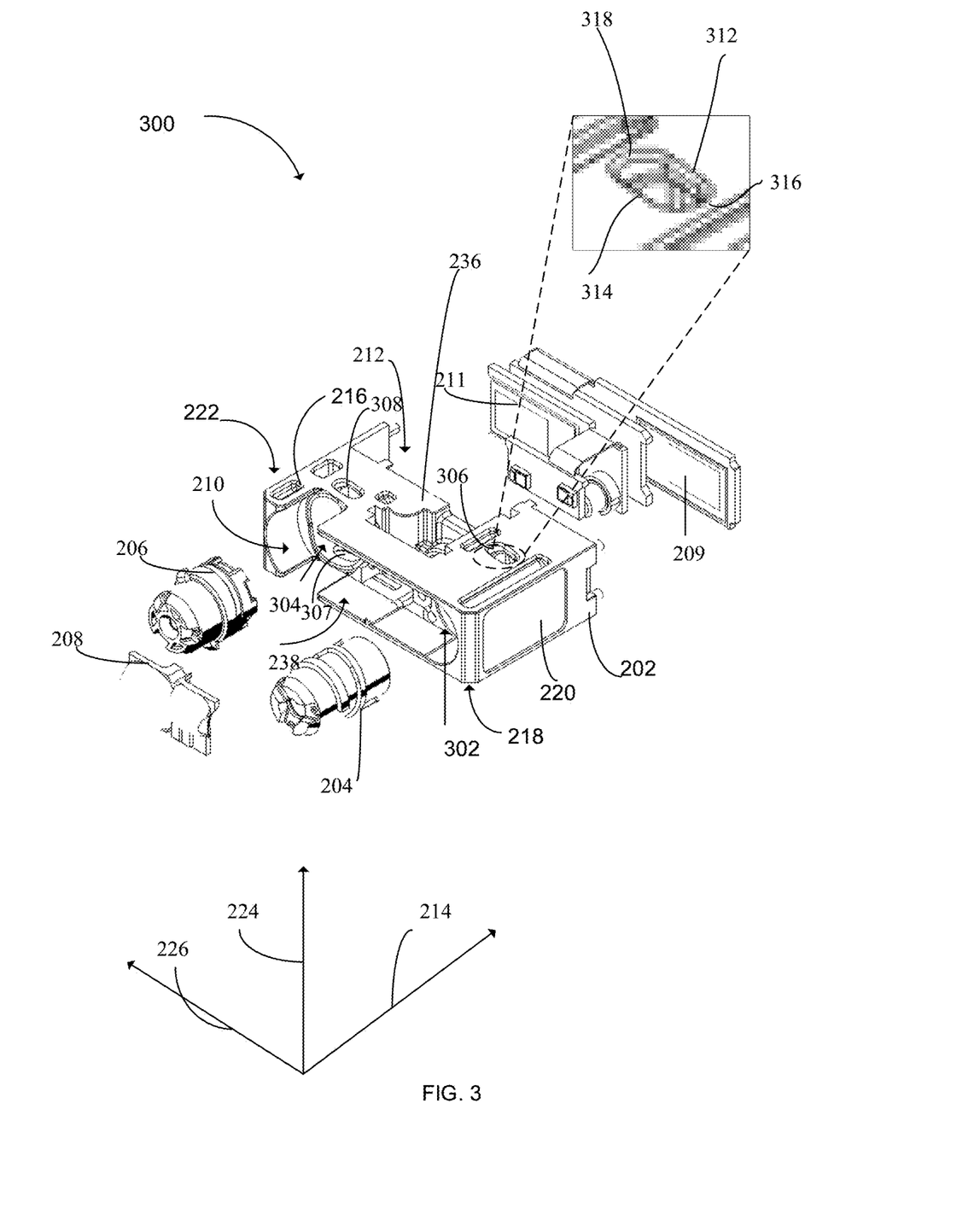
FIG. 3 illustrates an exploded view of the imaging unit, according to one or more embodiments described herein.

FIG. 2 and FIG. 3 illustrate a perspective view 200 and an exploded view 300 of the imaging unit 116, respectively, according to one or more embodiments described herein. Referring to FIG. 2, the imaging unit 116 includes a housing 202, a first lens barrel 204, a second lens barrel 206, an illumination and aiming lens assembly 208, a first image sensor 209, and a second image sensor 211.

The housing 202 of the imaging unit 116 corresponds to a cuboidal housing that includes a scan window end portion 210 and a sensor end portion 212. In an example embodiment, the scan window end portion 210 may be spaced apart from the sensor end portion 212 along a second lateral axis 214. The sensor end portion 212 of the housing 202 may be configured to fixedly receive the first image sensor 209 and the second image sensor 211. Further, the scan window end portion 210 of the housing 202 may be configured to be pointed towards the scan window end 110 of the head portion 104, in an instance in which the imaging unit 116 is received in the head portion 104 of the image capturing device 102.

Further, the housing 202 of the imaging unit 116 has top portion 216, a bottom portion 218, a first side portion 220, and a second side portion 222. In an example embodiment, the bottom portion 218 is parallel to the top portion 216. Further, the bottom portion 218 and the top portion 216 are spaced apart from each other along a vertical axis 224. In some examples, the first side portion 220 is parallel to the second side portion 222. Further, the first side portion 220 and the second side portion 222 are spaced apart along a second longitudinal axis 226. In an example embodiment, the second lateral axis 214, the vertical axis 224, and the second longitudinal axis 226 are perpendicular to each other.

In some examples, the top portion 216 of the housing 202 has a top surface 228, while the bottom portion 218 has a bottom surface 230. Similarly, in some examples, the first side portion 220 and the second side portion 222 has a first side surface 232 and a second side surface 234, respectively. In an example embodiment, the top surface 228, the bottom surface 230, the first side surface 232, and a second side surface 234, together define an outer surface 236 of the housing 202.

Referring to FIG. 3, the housing of the imaging unit 116 has an inner surface 238. The inner surface 238 of the housing 202 defines a first lens channel 302 such that the first lens channel is positioned proximal to the first side portion 220 of the housing 202 and distal from the second side portion 222 of the housing 202. Further, the inner surface 238 of the housing 202 defines a second lens channel 304 such that the second lens channel positioned proximal to the second side portion 222 of the housing 202 and distal from the first side portion 220 of the housing 202. In an example embodiment, the first lens channel 302 and the second lens channel 304 extends between the scan window end portion 210 and the sensor end portion 212, of the housing 202. In some examples, the first lens channel 302 and the second lens channel 304 may have a cylindrical shape. Further, the first lens channel 302 and the second lens channel 304 are sized to receive the first lens barrel 204 and the second lens barrel 206.

Figure 4:
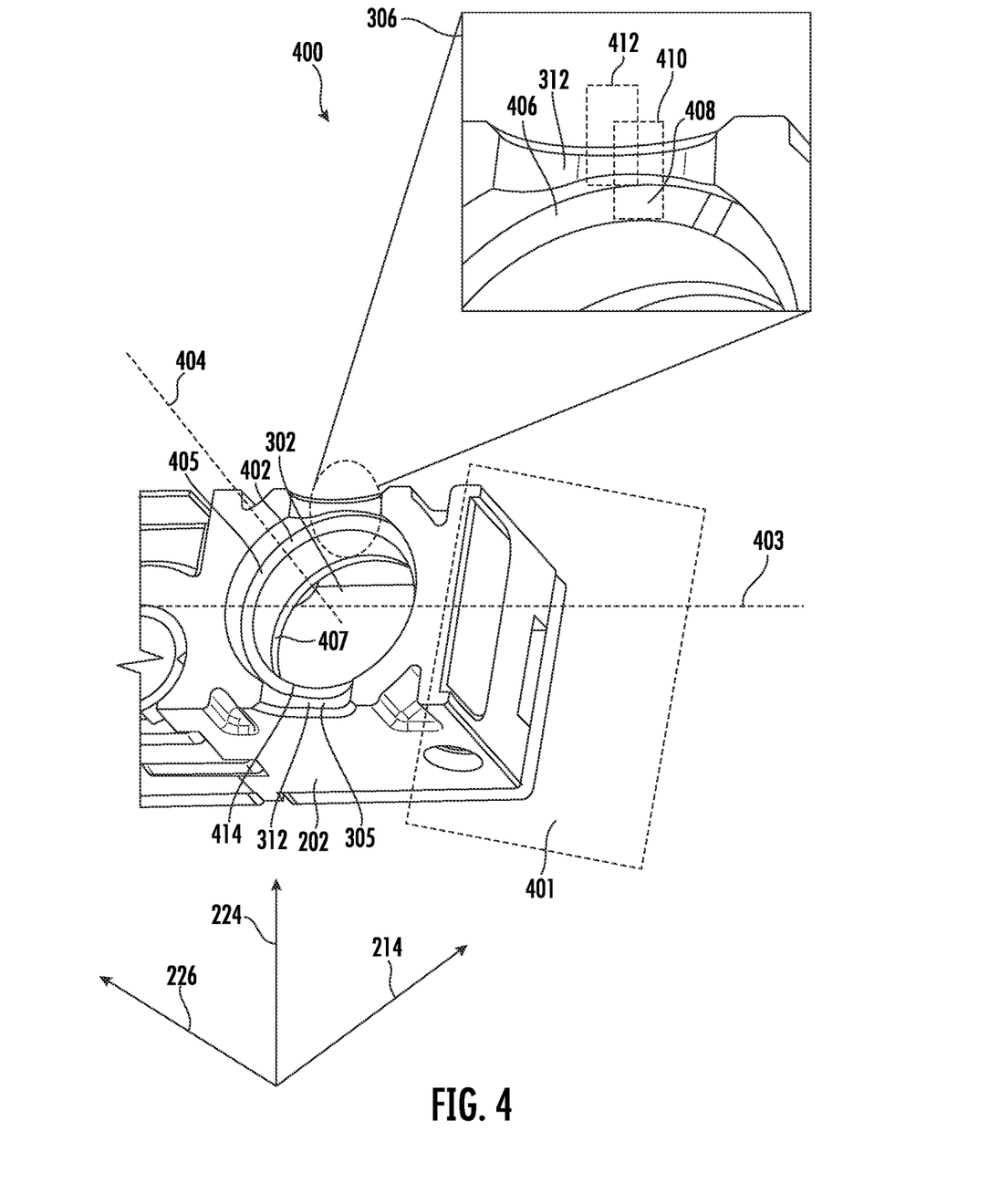
FIG. 4 illustrates a sectional view a housing of the imaging unit, according to one or more embodiments described herein.

Further, the inner surface 238 of the housing 202 defines a first glue pocket 306 and a second glue pocket 305 in the first lens channel 302. Furthermore, the inner surface 238 of the housing defines a third glue pocket 307 and fourth glue pocket 308 in the second lens channel 302. The second glue pocket 305 in the first lens channel 302 is depicted in FIG. 4. In an example embodiment, the first glue pocket 306, the second glue pocket 308, the third glue pocket 307 and the fourth glue pocket 308 correspond to a through hole that extends from the inner surface 238 of the housing 202 to the outer surface 236 of the housing 202. For example, in the second lens channel 304, the fourth glue pocket 308 extends from the inner surface 238 of the housing 202 to the top surface 228 of the housing 202. Similarly, in the second lens channel 304, the third glue pocket 307 extends from the inner surface 238 of the housing 202 to the bottom surface 230 of the housing 202.

In an example embodiment, the structure of the first glue pocket 306, the second glue pocket 305, the third glue pocket 307 and the fourth glue pocket 308 are same. The structural details of the first glue pocket, described hereinafter, are also applicable on the second glue pocket 305, the third glue pocket 307 and the fourth glue pocket 308.

In some examples, defining a glue pocket (e.g., the first glue pocket 306) creates one or more edge surfaces in the housing 202 that may define a periphery of the first glue pocket 306. The one or more edge surfaces may extend from the inner surface 238 of the housing 202 to the outer surface 236 of the housing 202. In an example embodiment, the one or more edge surfaces (defining the periphery of the first glue pocket 306) includes a first edge surface 312, a second edge surface 314, a third edge surface 316, and a fourth edge surface 318.

In an example embodiment, the first edge surface 312 of the one or more edge surfaces (defining the periphery of the first glue pocket 306) may be proximate to the sensor end portion 212 of the housing 202, while the second edge surface 314 of the one or more edge surfaces (defining the periphery of the first glue pocket 306) may be proximate to the scan window end portion 210 of the housing 202. Further, the first edge surface 312 of the one or more edge surfaces (defining the periphery of the first glue pocket 306) is parallel to the second edge surface 314 of the one or more edge surfaces (defining the periphery of the first glue pocket 306). In some examples, the scope of the disclosure is not limited to the second edge surface 314 being parallel to the first edge surface 312. In an example embodiment, the first edge surface 312 may not be parallel to the first edge surface 314, without departing from the scope of the disclosure.

In an example embodiment, the first edge surface 312 of the one or more edge surfaces is spaced apart from the second edge surface 314 along the second lateral axis 214 of the housing 202 by a first predetermined distance. The significance of the first predetermined distance is described later in conjunction with FIG. 7.

In some examples, the third edge surface 316 of the one or more edge surfaces (defining the periphery of the first glue pocket 306) may be parallel to the fourth edge surface 318. Further, the third edge surface 316 is spaced apart from the fourth edge surface 318 along the second longitudinal axis 226 of the housing 202. Furthermore, the third edge surface 316 may be proximal to the first side portion 220 of the housing 202, while the fourth edge surface 318 may be proximal to the second side portion 222 of the housing 202. In some examples, the scope of the disclosure is not limited to the third edge surface 316 being parallel to the fourth edge surface 318. In an example embodiment, the third edge surface 316 and the fourth edge surface 318 may have a C-shaped profile and inverted C-shaped profile, respectively. In some examples, the scope of the disclosure is not limited to the third edge surface 316 and the fourth edge surface 318 having the C-shaped profile and inverted C-shaped profile, respectively. In an example embodiment, the third edge surface 316 and the fourth edge surface 318 may have any other profile, without departing from the scope of the disclosure.

In an example embodiment, the inner surface 238 defines a helical ramp (further described in FIG. 4) in each of the first lens channel 302 and the second lens channel 304. The structure of the helical ramp is further described in conjunction with FIG. 4.

FIG. 4 illustrates a sectional view 400 of the housing 202 obtained when the housing 202 is cut by a first plane 401 passing through the first glue pocket 306 and the second glue pocket 305 along the vertical axis 224, according to one or more embodiments described herein. The sectional view 400 of the housing 202 illustrates that the inner surface 238 of the housing 202 defines the helical ramp 402 such that the helical ramp 402 protrudes out from the inner surface 238 of the housing 202 within the first lens channel 302. Further, the helical ramp 402 rotates about a first central longitudinal axis 404 of the first lens channel 302. Furthermore, the helical ramp 402 is angled at a first predetermined pitch with respect to a first lateral axis 403 of the housing 202. In an example embodiment, the first predetermined pitch of the helical ramp 402 may correspond to an angle between the helical ramp 402 and the first lateral axis 403.

In some examples, the helical ramp 402 protrudes out from the inner surface 238 of the housing 202 such that the helical ramp 402 has a first edge 405 and a second edge 407. The first edge 405 of the helical ramp 402 face towards to the scan window end portion 210 of the housing 202, while the second edge 407 of the helical ramp 402 face towards the sensor end portion 212 of the housing 202. In an example embodiment, the helical ramp 402 may have a first width along the vertical axis 224 of the housing 202. Further, the helical ramp 402 has a continuous width, as the helical ramp 402 rotates about the first central longitudinal axis 404 of the first lens channel 302. In some examples, the first width of the helical ramp 402 along the vertical axis 224 causes first edge 407 of the helical ramp to define a first step 406, as viewed from the scan window end portion 210 of the housing 202. The helical ramp 402 rotates about the first central longitudinal axis 404 of the first lens channel 302, the first step 406 (formed by the helical ramp 402 and the inner surface 238) also rotates about the first central longitudinal axis 404 of the first lens channel 302, and may have the first predetermined pitch with respect to the first lateral axis 403. Accordingly, the first step 406 may correspond to a helical step that rotates about the first central longitudinal axis 404 of the first lens channel 302. In some examples, as viewed from the top surface 228 of the housing, the first step 406 may have a portion 408 that is positioned below first edge surface 312 (of the one or more edge surfaces defining the periphery of the first glue pocket 306) along the vertical axis 224 of the housing 202. Further, as viewed from the top surface 228 of the housing, the first step 406 may have a portion 414 that is positioned above the first edge surface 312 of the one or more edge surfaces defining the periphery of the second glue pocket 305 on the bottom surface 230 of the imaging unit 116.

In some examples, the helical ramp 402 may have a first end and a second end (not shown). The first end of the helical ramp 402 and the second end of the helical ramp 402 correspond to circumferential extremities of helical ramp. Further, because of the first predetermined pitch of the helical ramp 402, the first end of the helical ramp 402 is positioned proximal to the scan window end portion of the housing while the second end of the helical ramp 402 is positioned proximal to the sensor end portion of the housing. In an instance in which the helical ramp 402 is defined to rotate by at least 360 degrees about the first central longitudinal axis 404 of the first lens channel 302, the first end of the helical ramp may be positioned adjacent to the second end of the helical ramp 402 along the first central longitudinal axis 404 of the first lens channel 302. Accordingly, the first end and the second end, in conjunction, define a blocking section. The purpose of the blocking section is further described below in conjunction with FIGS. 5-7.

In an example embodiment, a second plane 410 passing through the portion 408 of the first step 406, along the vertical axis 224 of the housing 202, may be parallel to a third plane 412 passing through a portion of the first edge surface 312, (of the one or more edge surfaces defining the periphery of the first glue pocket 306) along the vertical axis 224 of the housing 202. In alternative embodiment, the second plane 410 (passing through the portion 408 of the first step 406) may be coplanar the third plane 412 passing through the first edge surface 312 (of the one or more edge surfaces defining the periphery of the first glue pocket 306). Accordingly, the portion 408 of the first step 406 may be coplanar with a portion the first edge surface 312. For the purpose of ongoing description, it is considered that the portion 408 of the first step 406 (hereinafter referred to as the portion of the helical ramp 402) is parallel with the first edge surface 312. In an example embodiment, the helical ramp 402 is defined by the inner surface 238 between the first glue pocket 306 and the sensor end portion 212 of the housing 202.

In alternative embodiment, the helical ramp 402 may not have the second edge 407. In such embodiment, the helical ramp 402 protrudes out from the inner surface 238 of the housing 202 such that the helical ramp 402 extends from the first step 406 to the sensor end portion 212 of the housing 202. Therefore, the first step 406 divides the first lens channel 302 into a first portion and a second portion. In some examples, the first portion of the first lens channel 302 may extend from the scan window end portion 210 of the housing to the first step 406. The second portion of the first lens channel 302 extends from the first step 406 to the sensor end portion 212 of the housing 202.

For brevity, FIG. 4 depicts that the first glue pocket 306 and the second glue pocket 305 are defined to be lying on the first plane 401. In an alternative embodiment, the first glue pocket 306 may be defined at an offset from the second glue pocket 305 along the first lateral axis 118 of the housing 202. For example, the first edge surface 312 of the first glue pocket 306 may be at an offset from the first edge surface 312 of the second glue pocket 305 along the first lateral axis 118 of the housing 202. Similarly, the second edge surface 314 of the first glue pocket 306 may be at the offset from the second edge surface 314 of the second glue pocket 305 along the first lateral axis 118 of the housing 202. In some examples, the offset between the first edge surface 312 of the first glue pocket 306 and the first edge surface 312 of the second glue pocket 305 may be deterministic from the first predetermined pitch of the first step 406. For example, because of the first predetermined pitch of the first step 406, the portion 408 of the first step 406 (proximal to the top surface 228 of the housing 202) is offset from the portion 414 of the first step 406 (proximal to the bottom surface 230 of the housing 202). Accordingly, the first edge surface 312 of the first glue pocket 306 is at an offset from the first edge surface 312 of the second glue pocket 305.

In some examples, the scope of the disclosure is not limited to the first glue pocket 306, second glue pocket 305, the third glue pocket 307 and the fourth glue pocket 308 having same structure. In an example embodiment, the structure of the first glue pocket 306, the second glue pocket 305, the third glue pocket 307 and the fourth glue pocket 308 may vary based on the first predetermined pitch of the helical ramp 402.

In an example embodiment, the structure of the helical ramp 402 in the first lens channel 302, as is described in FIG. 4, is also applicable to a similar helical ramp (not depicted) defined in the second lens channel 304, without departing from the scope of the disclosure.

Referring back to FIG. 3, the first lens channel 302 and the second lens channel 304 are configured to receive the first lens barrel 204 and the second lens barrel 206, respectively. In an example embodiment, the structure of the first lens barrel 204 is similar to the structure of the second lens barrel 206, without departing from the scope of the disclosure. The structure the first lens barrel 204 is further described in conjunction with FIG. 5 and FIG. 6. The structural details described in FIG. 5 and FIG. 6 are also applicable on the second lens barrel 206.

Figure 5:
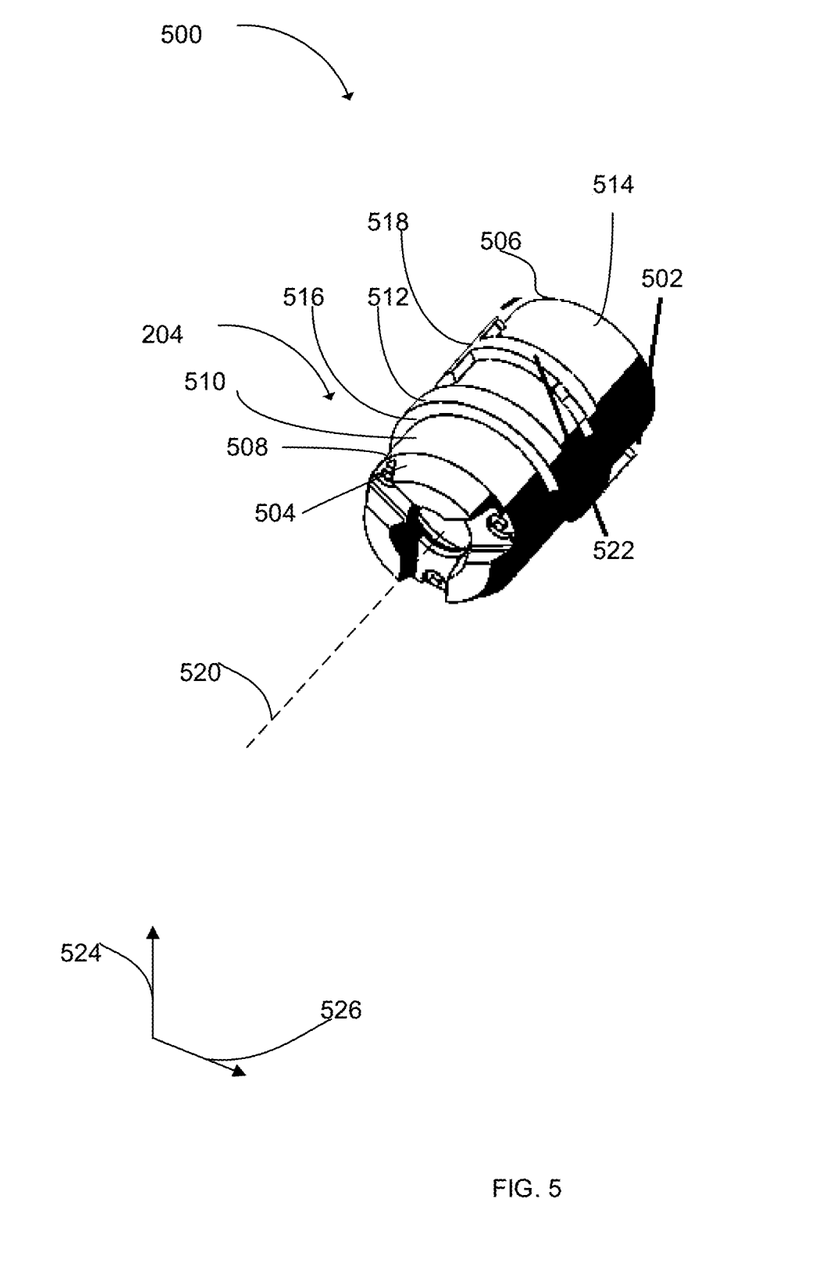
FIG. 5 illustrates a perspective view of a first lens barrel, respectively, according to one or more embodiments described herein.
Figure 6:
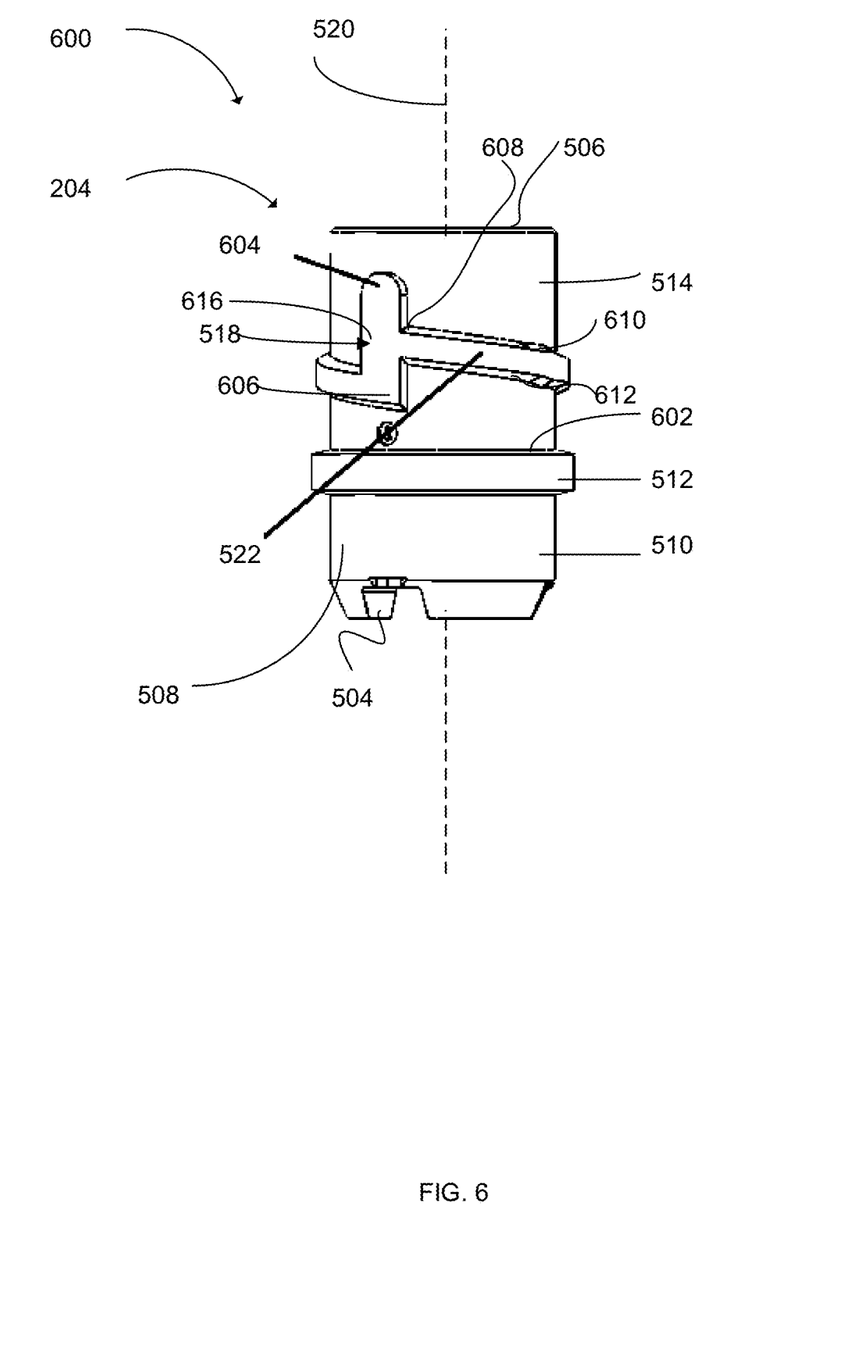
FIG. 6 illustrates a side view of the first lens barrel, respectively, according to one or more embodiments described herein.

FIG. 5 and FIG. 6 illustrate a perspective view 500 and a side view 600 of the first lens barrel 204, respectively, according to one or more embodiments described herein. Referring to FIG. 5, the first lens barrel 204 includes a lens housing 502 that may be configured to receive a lens assembly (not shown). The lens housing 502 may correspond to a cylindrical housing that has a light receiving end 504 and a sensor end 506. Further, the lens housing 502 has an outer surface 508 that extends between the light receiving end 504 and the sensor end 506. In an example embodiment, the outer surface 508 of the lens housing 502 defines a first portion 510, a flange portion 512, and a coupling portion 514.

In an example embodiment, the first portion 510 of the lens housing 502 extends between the light receiving end 504 and a first junction 516 between the first portion 510 and the flange portion 512. The flange portion 512 extends between the first junction 516 and a second junction 602 (refer FIG. 6) between the flange portion 512 and the coupling portion 514. In an example embodiment, the flange portion 512 may correspond to a protrusion that extends out from the outer surface 508 of the lens housing 502. Further, the flange portion 512 may rotate about the periphery of the lens housing 502. In an example embodiment, a diameter of the first lens barrel 204 in the flange portion 512 may greater than a diameter of the first lens barrel 204 in the first portion 510. In some examples, the outer surface 508 may define the flange portion 512 such that the flange portion 512 is defined proximal to the light receiving end 504 of the lens housing 502 and distal from the sensor end 506 of the lens housing 502. In some examples, the scope of the disclosure is not limited to the first lens barrel 204 having the flange portion 512, without departing from the scope of the disclosure.

In an example embodiment, the coupling portion 514 extends from the second junction 602 (refer FIG. 6) to the sensor end 506 of the lens housing 502. In an example embodiment, the outer surface 508 of the lens housing 502 defines a cam 518, in the coupling portion 514 (of the lens housing 502). In some examples, the cam 518 protrudes out from the outer surface 508 and extends along a second central longitudinal axis 520 of the lens housing 502.

Referring to FIG. 6, the cam 518 has a first end 604 and a second end 606. The second end 606 of the cam 518 is proximal to the second junction 602 and is distal from the sensor end 506 of the lens housing 502. Further, the first end 604 of the cam 518 is proximal to the sensor end 506 and is distal from the second junction 602. In some examples, the first end 604 of the cam 518 has a semi-circular profile. In some examples, the scope of the disclosure is not limited to the first end 604 of the cam 518 having the semi-circular profile. In alternative embodiment, the first end 604 of the cam 518 may have any other profile without departing from the scope of the disclosure. In an example embodiment, the cam 518 may further have a second width along a vertical axis 524. In some examples, the width of the cam 518 along the vertical axis 524 is same as the first width of the helical ramp 402 (defined in the first lens channel 302 of the housing 202).

In some examples, FIG. 5 and FIG. 6 illustrate only one cam 518. However, in alternative embodiment, the first lens barrel 204 may have more than one cam, without departing from the scope of the disclosure.

In an example embodiment, the outer surface 508 of the lens housing 502 further defines a helical rib 522 within the coupling portion 514 of the lens housing 502. In some examples, the helical rib 522 protrudes out from the outer surface 508 of the lens housing 502, and rotates about the periphery of the lens housing 502. In an example embodiment, the outer surface 508 defines the helical rib 522 such that the helical rib 522 is angled at a second predetermined pitch. In some examples, the second predetermined pitch may correspond to an angle between the helical rib 522 and second lateral axis 526 of the first lens barrel 204. In an example embodiment, the second predetermined pitch of the helical rib 522 is same as the first predetermined pitch of the helical ramp 402 (defined in the each of the first lens channel 302 and the second lens channel 304).

In some examples, the helical rib 522 may intersect the cam 518 at one or more portions. For example, the helical rib 522 may intersect the cam 518 at the second end 606 of the cam 518. Additionally, the helical rib 522 may intersect the cam 518 at a third junction 608 between the cam 518 and the helical rib 522. In an example embodiment, the third junction 608 may be positioned between the first end 604 of the cam 518 and the second end 606 of the cam 518. In some examples, the scope of the disclosure is not limited to the helical rib 522 intersecting the cam 518. In an alternative embodiment, the helical rib 522 may not intersect the cam 518. In such an implementation, the helical rib 522 may have a first end (not shown) and a second end (not shown). The first end of the helical rib 522 may be positioned proximal to the second end 606 of the cam 518, while the second end of the helical rib 522 may be positioned proximal to a central portion 616 of the cam 518. In some examples, the central portion of the cam 518 may correspond to a portion between the first end 604 and the second end 606, of the cam 518.

In some examples, the helical rib 522 has a first edge 610 and a second edge 612. The first edge 610 of the helical rib 522 face towards the sensor end 506 of the lens housing 502. Further, the second edge 612 of the helical rib 522 face towards the second junction 602 between the coupling portion 514 of the lens housing 502 and the flange portion 512 of the lens housing 502. In some examples, the helical rib 522 may have a third width that may be defined as a distance, measured along the second central longitudinal axis 520, between the first edge 610 of the helical rib 522 and the second edge 612 of the helical rib 522. Further, the helical rib 522 has a fourth width along the vertical axis 524. The fourth width of the helical rib 522 may be same as the second width of the cam 518.

In alternate embodiment, the helical rib 522 may not have the second edge 612. In such an embodiment, the helical rib 522 may protrude out from the outer surface 508 of the first lens barrel 204 such that the helical rib 522 extend from the flange portion 512 to the first edge 610 of the helical rib 522. To this end, the first edge 610 of the helical rib 522 corresponds to a second step as viewed from the sensor end 506 of the first lens barrel 204. Further, in such embodiment, the cam 518 may not have the second end 606. Referring back to FIG. 3 and FIG. 2, to assemble the imaging unit 116, the first image sensor 209 and the second image sensor 211 are mounted at the sensor end portion 212 of the housing 202. In some examples, the first image sensor 209 is mounted at the sensor end portion 212 such that the first image sensor 209 aligns with the first lens channel 302. Similarly, the second image sensor 211 is mounted at the sensor end portion 212 such that the second image sensor 211 aligns with the second lens channel 304. Further, in an example embodiment, the first lens channel 302 and the second lens channel 304 are configured to receive the first lens barrel 204 and the second lens barrel 206, respectively. In an instance in which the first lens barrel 204 is received in the first lens channel 302, the first end 604 of the cam 518 slibably abuts the first step 406 (defined by the helical ramp 402) in the first lens channel 302 of the first lens barrel 204. In some examples, the cam 518 and the first step 406 (defined in the first lens channel 302) prevents the first lens barrel 204 from proceeding into the first lens channel 302 towards the first image sensor 209. Similarly, the cam 518, defined on the second lens barrel 206, and the first step 406 (defined in the second lens channel 304) prevents the second lens barrel 206 from proceeding into the second lens channel 304 towards the second image sensor 211. Further, when the cam 518 abuts the first step 406, the first edge 612 of the helical rib 522 is positioned at a second predetermined distance from the first step 406.

In some examples, (during assembly of the imaging unit 116) the first lens barrel 204 may be rotatable within first lens channel 302, while the first end 604 of the cam abuts the first step 406, to adjust a focal point of the first lens barrel 204. In an example embodiment, the first step 406 (defined by the helical ramp 402) may provide a track (by means of the first step 406) for rotating the first lens barrel 204. For example, the first end 604 of the cam 518 may be slidable on the first step 406 (defining the track) to facilitate rotating of the first lens barrel 204 within the first lens channel 302. Since the first step 406 has the first predetermined pitch with respect to the first lateral axis 403, sliding the cam 518 (defined on the first lens barrel 204) causes the first lens barrel 204 to move along the first central longitudinal axis 404 of the first lens channel 302. Accordingly, the position of the first lens barrel 204 within the first lens channel 302 gets modified. Modifying the position of the first lens barrel 204 modifies the focal point of the first lens barrel 204. In some examples, the focal point of the first lens barrel 204 may be modified in order to ensure that the first lens barrel 204 focuses light on the first image sensor 209 (aligned with the first lens channel 302).

In some examples, the rotation of the first lens barrel 204 within the first lens channel 302 is restricted by the blocking section defined by the first end (not shown) of the helical ramp 402 and the second end (not shown) of the helical ramp 402. For example, the first lens barrel 204 may be rotatable in a clockwise direction in the first lens channel 302 until the cam 518 on the first lens barrel 204 abuts the blocking section (defined by the first end of the helical ramp 402 and the second end of the helical ramp 402). The blocking section thwarts further rotation of the first lens barrel 204 in the clockwise direction. In some examples, the first lens barrel 204 may be thereafter rotatable in the counter-clockwise direction.

Figure 7:
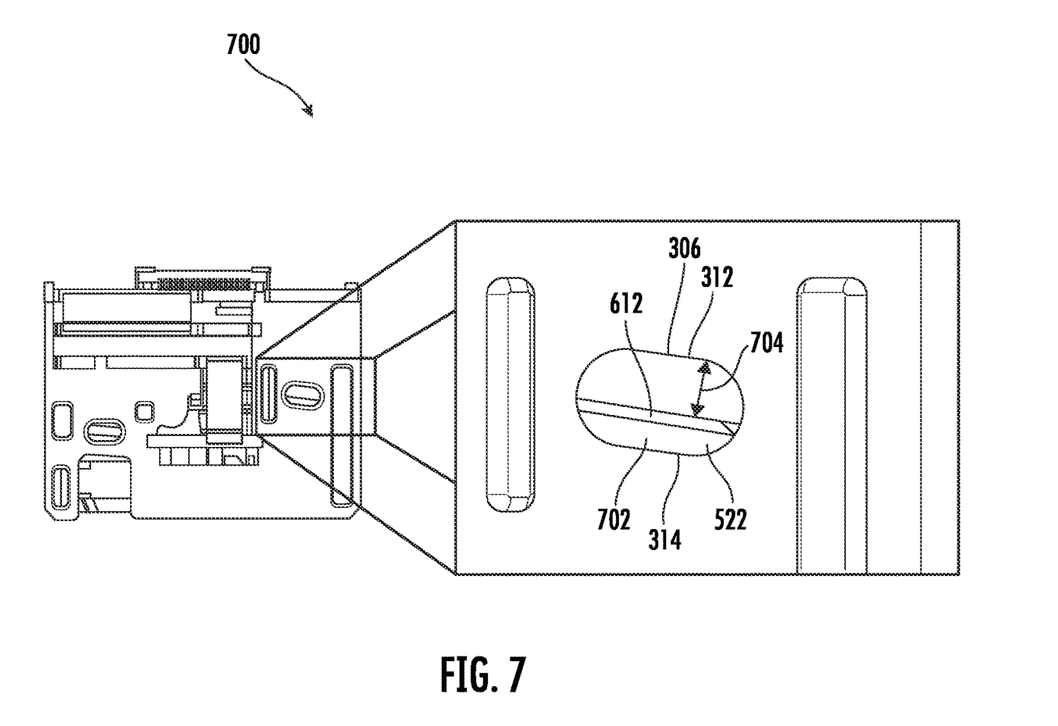
FIG. 7 illustrates a top view of the imaging unit, according to one or more embodiments described herein.

Further, in an instance in which the first lens barrel 204 is received in the first lens channel 302 and the first end 604 of the cam 518 abuts the helical ramp 402, a portion of the helical rib 522 (defined on the first lens barrel 204) extends out from the second edge surface 314 of the one or more edge surfaces defining the first glue pocket 306, as is further illustrated in FIG. 7. In some examples, to enable that the portion of the helical rib 522 extends out from the second edge surface 314, the first predetermined distance between the first edge surface 312 and the second edge surface 314 may be greater than a second predetermined distance between the first edge 612 of the helical rib 522 and the step 408.

FIG. 7 illustrates a top view 700 of the imaging unit 116, according to one or more embodiments described herein. Referring to FIG. 7, a portion 702 of the helical rib 522 extends out from the second edge surface 314 of the one or more edge surfaces defining the periphery of the first glue pocket 306. In some examples, the portion 702 of the helical rib 522 includes the first edge 612 of the helical rib 522. In another example, the portion 702 of the helical rib 522 may exclude the second edge 614 of the helical rib 522. Since the second predetermined pitch of the helical rib 522 is same as the first predetermined pitch of the helical ramp 402, accordingly, the helical rib 522 is parallel to the helical ramp 402 (not visible in FIG. 7). Further, since the first edge surface 312 of the one or more edge surfaces (defining the periphery of the first glue pocket 306) is parallel with the portion 408 of the helical ramp 402, the first edge surface 312 (defining the periphery of the first glue pocket 306) is parallel to the helical rib 522. Accordingly, a third predetermined distance (depicted by 704) between the first edge 612 of the helical rib 522 and the first edge surface 312 (defining the periphery of the first glue pocket 306) remains constant, irrespective of the position of the first lens barrel 204 in the first lens channel 302. For example, when the position of the first lens barrel 204 is modified (by rotating the first lens barrel 204 in the first lens channel 302), the third predetermined distance 704 between the first edge 612 of the helical rib 522 and the first edge surface 312 (defining the periphery of the first glue pocket 306) remains constant.

Once the position of the first lens barrel 206 is set in the first lens channel 302, adhesive may be disposed in the first glue pocket 306 and the second glue pocket 305 of the first lens channel 302. Since the distance between the first edge 612 of the helical rib 522 and the first edge surface 312 (defining the periphery of the first glue pocket 306) remains constant, the glue is uniformly disposed between the first edge 612 of the helical rib 522 and the first edge surface 312 (defining the periphery of the first glue pocket 306). As discussed, in some examples, since the portion of the helical ramp 402 is parallel with the first edge surface 312 (defining the periphery of the first glue pocket 306), the adhesive is uniformly disposed between the first edge 612 of the helical rib 522 and the helical ramp 402. Accordingly, in an instance in which the adhesive cures, the adhesive shrinks leading to the first edge 612 of the helical rib 522 getting pulled towards the helical ramp 402. To this end, the first end 604 of the cam 518 gets tightly abutted with the helical ramp 402.

Further, since the distance between the first edge 612 of the helical rib 522 and the first edge surface 312 (defining the periphery of the first glue pocket 306) remains constant, an amount of adhesive to be disposed remains constant during manufacturing of various imaging units as well. Accordingly, variations due to curing of the glue (e.g., movement of the lens barrel within lens channel due to curing of the glue) remain consistent during manufacturing of various imaging units. Therefore, any anticipated change in focal point of the lens barrel can be compensated prior to curing of the glue.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the image capturing device. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An image capturing device comprising:
   an imaging unit comprising:
      a housing that comprises an inner surface, wherein the inner surface of the housing defines a lens channel, wherein the inner surface of the lens channel defines:
         a helical step that protrudes outwardly from the inner surface into the lens channel, wherein the helical step is angled at a first predetermined pitch, and
         a glue pocket, in the lens channel, which extends from the inner surface of the lens channel to an outer surface of the housing such that a first edge surface, defining a portion of a periphery of the glue pocket, is parallel with a portion of the helical step; and
      a lens barrel received in the lens channel, the lens barrel comprising an outer surface that defines:
         a cam that protrudes from the outer surface of the lens barrel, wherein the cam abuts the helical step, and
         a helical rib that protrudes from the outer surface of the lens barrel, wherein the helical rib is angled at a second predetermined pitch, wherein the first predetermined pitch of the helical step is the same as the second predetermined pitch of the helical rib.

2. The image capturing device of claim 1, wherein the housing further comprises a second edge surface, a third edge surface, and a fourth edge surface, wherein the first edge surface, the second edge surface, the third edge surface, and the fourth edge surface define the periphery of the glue pocket, and wherein the second edge surface is parallel to the first edge surface.

3. The image capturing device of claim 2, wherein a portion of the helical rib extends out from the second edge surface, defining the portion of the periphery of the glue pocket.

4. The image capturing device of claim 2, wherein a distance between the first edge surface of the glue pocket and an edge of the helical rib remains constant as the cam slides over the helical step to adjust a position of the lens barrel in the lens channel.

5. The image capturing device of claim 2, wherein a distance between the second edge surface of the glue pocket and an edge of the helical rib remains constant as the cam slides over the helical step to adjust a position of the lens barrel in the lens channel.

6. The image capturing device of claim 2, wherein glue is disposed between the edge of the helical rib and the first edge surface, defining the periphery of the glue pocket.

7. The image capturing device of claim 1, wherein the first edge surface of the glue pocket, the helical rib, and the helical step are parallel to each other.

8. The image capturing device of claim 1, wherein the housing has a scan window end portion, and a sensor end portion spaced apart from the scan window end portion along a lateral axis perpendicular to a longitudinal axis of the housing.

9. The image capturing device of claim 1, wherein the cam has a first end and a second end, wherein the first end of the cam abuts the helical step.

10. The image capturing device of claim 9, wherein the helical rib intersects with the cam at the first end of the cam.

11. A housing of an imaging unit, the housing comprising:
   an outer surface and an inner surface, wherein the inner surface of the housing defines:
      a lens channel sized to receive a lens barrel,
      a helical step in the lens channel, wherein the helical step protrudes outwardly into the lens channel, and wherein the helical step is angled at a first predetermined pitch, and
      a glue pocket, in the lens channel, which extends from the inner surface of the lens channel to the outer surface of the housing such that a first edge surface, defining a portion of a periphery of the glue pocket, is parallel with a portion of the helical ramp.

12. The housing of claim 11, wherein the helical step, defined in the lens channel, is configured to slidably abut a cam defined on an outer surface of the lens barrel, in an instance in which the lens barrel is received in the lens channel.

13. The housing of claim 11, wherein a portion of a helical rib defined on the lens barrel extends out from a second edge surface of the glue pocket, in an instance in which the lens barrel is received in the lens channel.

14. The housing of claim 13, wherein a distance between the first edge surface, defining a portion of the periphery of the glue pocket, and an edge of the helical rib remains constant, as a position of the lens barrel in the lens channel is adjusted by sliding the lens barrel on the helical step.

15. The housing of claim 13, wherein the helical rib on the lens barrel is angled at a second predetermined pitch, wherein the second predetermined pitch is same as the first predetermined pitch of the helical step.

16. The housing of claim 15 further comprising an image sensor disposed at the sensor end portion of the housing.

17. The housing of claim 15 further comprising a scan window disposed at the scan window end portion of the housing.

18. The housing of claim 11, wherein the housing has a scan window end portion, and a sensor end portion spaced apart from the scan window end portion along a lateral axis of the housing.

19. The housing of claim 11, wherein the housing further comprises a second edge surface, a third edge surface, and a fourth edge surface, wherein the first edge surface, the second edge surface, the third edge surface, and the fourth edge surface define the periphery of the glue pocket, and wherein the second edge surface is parallel to the first edge surface.

* * * * *